(No Model.)   3 Sheets—Sheet 1.
A. H. DODD.
POTATO DIGGER.
No. 514,065.   Patented Feb. 6, 1894.
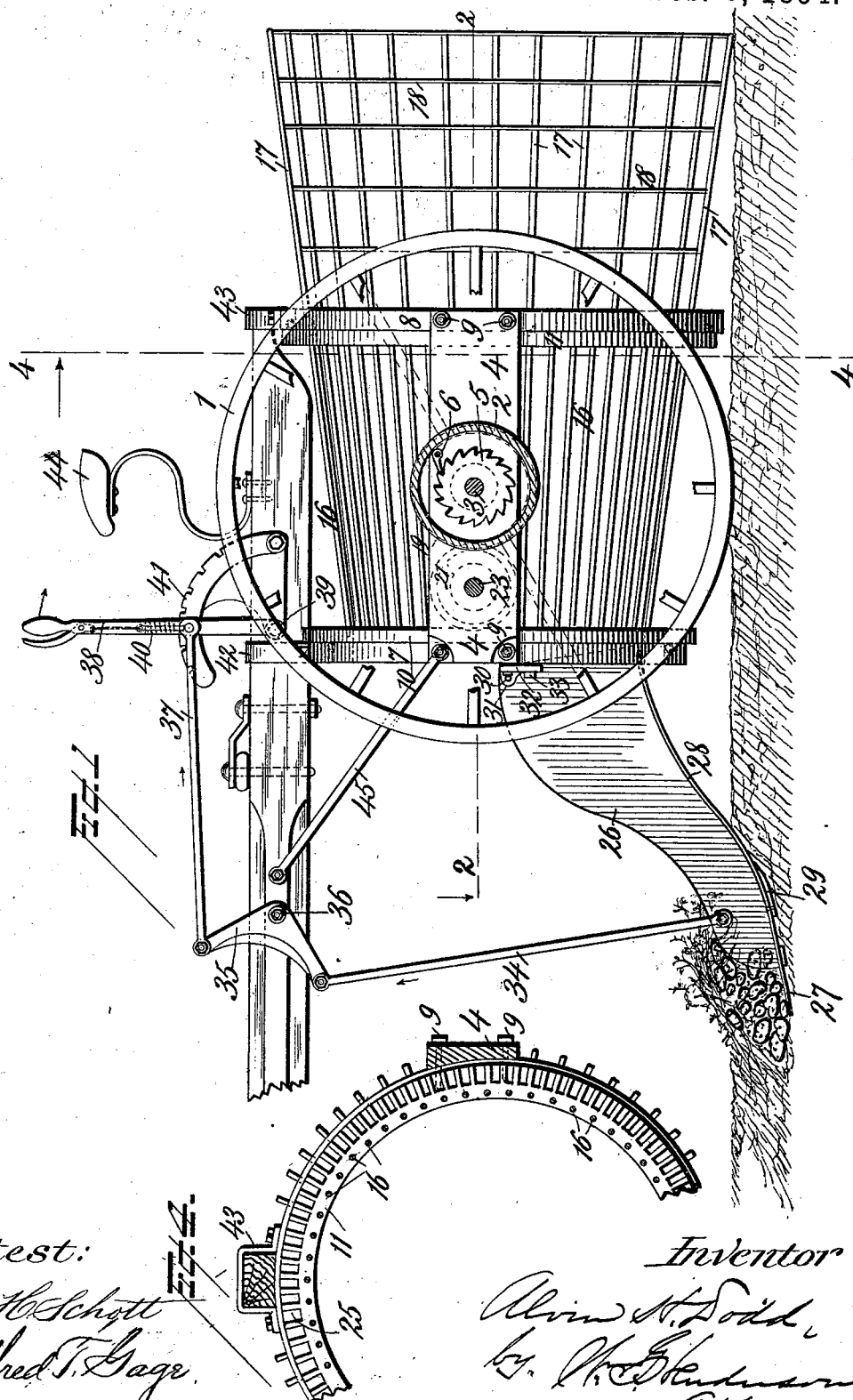
Attest:
F. H. Schott
Alfred T. Gage
Inventor
Alvin H. Dodd
by W. F. Henderson
Attorney (No Model.) 3 Sheets—Sheet 2.
A. H. DODD.
POTATO DIGGER.
No. 514,065. Patented Feb. 6, 1894.
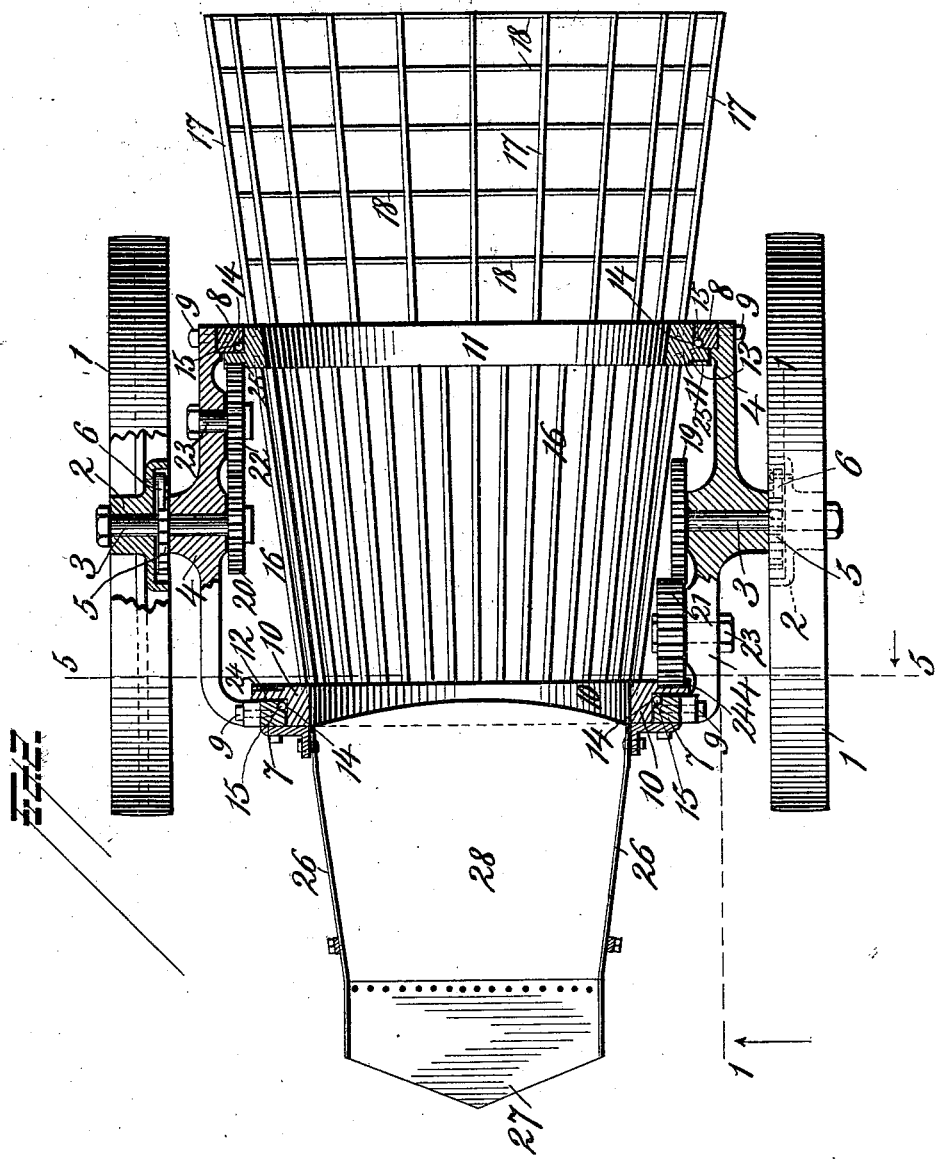

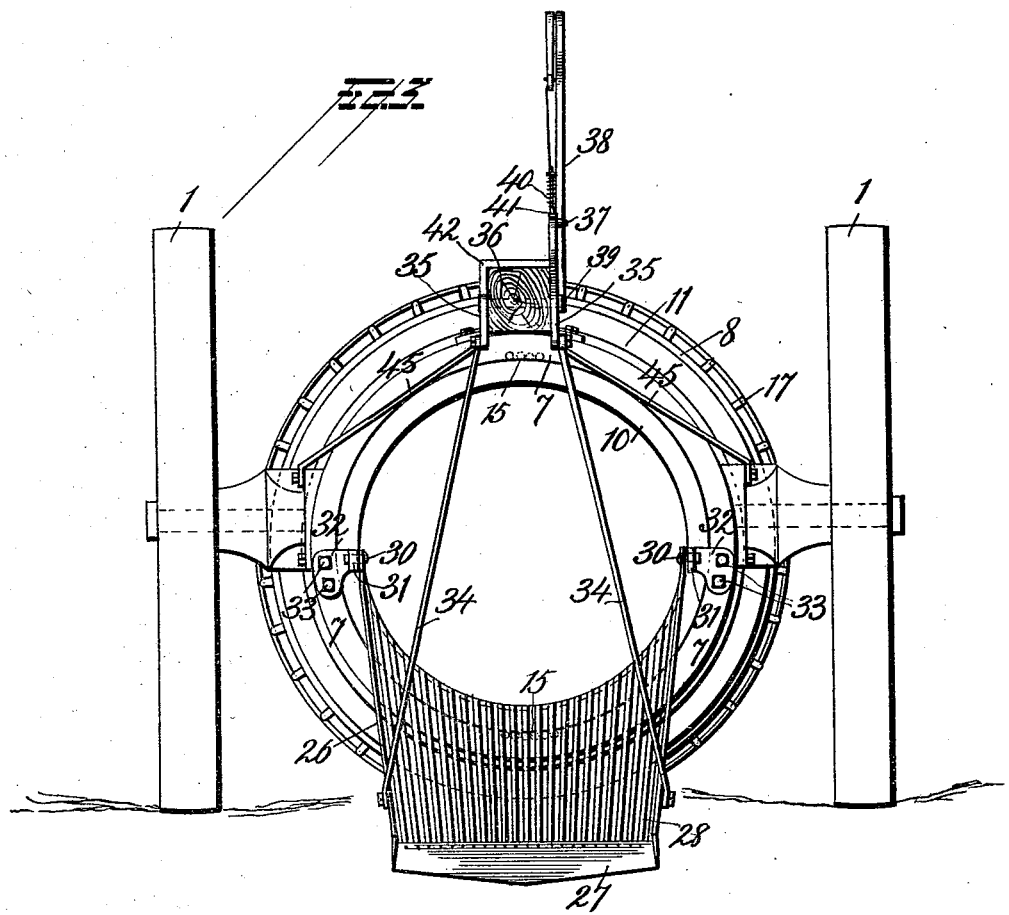

UNITED STATES PATENT OFFICE.

ALVIN HARVEY DODD, OF CHICAGO, ILLINOIS.

POTATO-DIGGER.

SPECIFICATION forming part of Letters Patent No. 514,065, dated February 6, 1894.

Application filed December 22, 1892. Serial No. 455,932. (No model.)

*To all whom it may concern:*

Be it known that I, ALVIN HARVEY DODD, a citizen of the United States, residing at Chicago, in the county of Cook and State of Illinois, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to potato diggers; and it has for its objects to provide a reel into which the potatoes and their vines will be discharged from a shovel that takes them from the soil, which reel revolves so as to separate the potatoes from the vines and soil and allows the soil to pass down through the reel to the ground while the potatoes are allowed to drop through the rear of the reel onto the ground and the vines and trash are delivered from the reel at the rear or tail end thereof onto the ground, the soil, potatoes, and trash being separated from each other and deposited separately onto the ground beneath the reel; also to provide an improved construction of shovel and its attachment to the machine in front of the reel; also to provide a new construction of reel; and also to provide an improved construction of frame or saddle for the reel to revolve in; also, to provide for the revolving of front and rear portions of the reel at the same speed, or substantially so, thereby preventing undue strain of the parts; also, to provide novel means for transmitting power to the reel; also, to provide generally for a novel combination of parts; and also, the most desirable construction of the several parts entering into the combination.

To the accomplishment of the foregoing, and such other objects as may hereinafter appear, the invention consists in the construction, and also in the combination of parts hereinafter particularly described and then sought to be specifically defined by the claims, reference being had to the accompanying drawings forming a part hereof, in which—

Figure 1 is a side elevation of the machine part in section on the line 1—1 of Fig. 2 omitting the spokes from the wheels for a clearer illustration of other members of the machine. Fig. 2 is a horizontal section on line 2—2 of Fig. 1 of the machine. Fig. 3 is a front elevation of the machine. Fig. 4 is a detail section on line 4—4 of Fig. 1; and Fig. 5 is a detail section on line 5—5 of Fig. 2.

In the drawings the numeral 1 designates the wheels of the machine, the hubs 2 of which are journaled on the pins or shafts 3 so as to turn thereon, said shafts turning in the side castings 4 which are of increased thickness where the shafts pass through them. The said shafts have keyed or otherwise rigidly secured to them pinions or ratchets 5 with which engage pawls 6 pivoted to the hubs of the wheels so that motion will be given to said ratchets by the wheels, and so that the ratchets will not turn backward, the pawls being held in positive engagement with the ratchets. The side castings 4 have secured to their front and rear ends, rings 7 and 8 by suitable means, for instance, by bolts 9 passed through the side castings and screwed into the rings, the rear ring being of a larger diameter than the front ring. Within these rings fit revoluble rings 10 and 11, said rings being formed with flanges 12 and 13 bearing against the inside faces of rings 7 and 8 so that when the rings 10 and 11 are connected together they will be held in place within the rings 7 and 8. It is preferred to form ball bearings between the two sets of rings and for that purpose grooves are formed in one of the rings of each set. For instance grooves 14 are made say in the rings 7 and 8 and in these grooves are placed the balls 15. The rings 10 and 11 are thus allowed to revolve with little friction in the rings 7 and 8, which are stationary. The rings 10 and 11 are connected together by bars or rods 16 which are suitably connected at opposite ends to the two rings, for instance, by having the ends of the rods threaded and screwed into the rings, or otherwise. These bars or rods 16 are in a full size machine preferably set so that they will be one and a quarter inches apart. In the outer faces of the rear ring 11 are secured a number of bars or rods 17 which will form the rear portion of the reel, these bars or rods being in the same line with the bars or rods 15, and they may have their outer extremities connected together, or left free as illustrated in the drawings.

The small potatoes and dirt fall between the bars or rods that are between the front and rear rings, and the larger potatoes will drop between the rod or bars which extend rearwardly from the rear ring, and to prevent the vines and trash from dropping between these rear bars it is preferred to employ strips or wires 18 running transversely to the bars or rods 17 and wound around or interlaced therewith, or otherwise secured thereto. This will prevent the vines and trash from falling between the bars or rods and will cause the same to be delivered from the reel at the rear end thereof over the tail of the reel. It will be observed that under this construction the reel is of a conical form, the smallest diameter of the reel being at its forward end and its largest diameter at its rear end. This effects a better separation of the dirt, potatoes and vines and a better assortment of the potatoes into graded sizes.

The reel is revolved by power transmitted from the driving wheels 1, said power being conveyed through cog wheels 19 and 20 secured to the pins or shafts 3 and meshing with toothed wheels 21 and 22 journaled upon pins 23 passing through the side castings 4, which toothed wheels 21 and 22 mesh with teeth 24 and 25 formed on the inside faces of the rings 10 and 11 respectively. These toothed power transmitting wheels are arranged preferably as shown so as to lie on opposite sides of a line drawn through the axle of the driving wheels and on opposite sides of the reel so that the power will be applied to the reel at diagonally opposite points thereby relieving the parts of undue strain and causing the power to be applied where the best results will be obtained. The power transmitting toothed wheels are so proportioned in size and number of teeth and the teeth of the rings 10 and 11 so proportioned that both of the rings 10 and 11 will revolve at the same speed, thus insuring an easy rotation of the wheel without binding of any of the parts.

The shovel is composed of a casting having sides 26 and a shoe or point 27, and a bottom 28 which may be made of a single piece or of a series of slats secured to a plate 29 which may be riveted as shown to the upper end of the shoe or point 27. The upper end of this shovel fits inside of the ring 10 and has the same circle as that ring so that the easy revolution of the ring will not be interfered with. The shovel is suitably pivoted so as to admit of being raised and lowered, which pivoting may be effected by pins or bolts 30 passing through the upper end of the rear portion of the shovel and into ears 31 formed on the lugs 32 which may be secured to the stationary ring 7 by bolts 33. Links 34 are pivoted at their lower ends to the lower portion of the sides 26 of the shovel and at their upper ends are pivoted to the lower arms of the bell crank levers 35 which are fulcrumed to the shaft 36 and have their upper ends connected to rods 37 which at their rear ends are connected to a hand lever 38 fulcrumed to the shaft at 29 and provided with a spring actuated latch 40 adapted to engage with a segment 41 so that by releasing the latch and moving the lever 38 the shovel may be raised or lowered and held to its adjustment by the latch engaging notches in the segment 41, of which there may be one or more as desired or found convenient. The tongue may be secured in place in any suitable manner, for instance, by straps 42 and 43 passing around the tongue and secured by bolts to the rings 7 and 8.

The seat for the driver is indicated by the numeral 44.

The frame or saddle of the machine in which the reel revolves is composed of the side castings 4 and rings 7 and 8.

The toothed wheels 21 and 22 are employed because it is inconvenient to have the toothed wheels 19 and 20 of a size sufficient to mesh directly with the rings 10 and 11. It will therefore be apparent that any other arrangement of wheels that will transmit power from the driving wheel's shafts to the rings 10 and 11 may be employed without departing from the invention.

I have described with particularity the details of construction of the several parts and their arrangement in relation to one another, but I do not mean to confine myself to such details as it is obvious that departures may be made therefrom and the essential features of my invention still employed.

The tongue or shaft 26 may be braced by rods 45 extending from it to the side pieces 4 of the saddle or frame of the machine.

Having described my invention and set forth its merits, what I claim is—

1. In a potato digger, the combination of a conical revolving reel, the diameter of which increases from front to rear and means for revolving said reel, substantially as and for the purposes described.

2. In a potato digger, the combination of a conical revolving reel, provided with two power receiving rings of different diameters, and means for revolving said rings at the same rate of speed, substantially as and for the purposes described.

3. In a potato digger, the combination of a revolving reel, having two power receiving rings of different diameters, and means for revolving said rings at the same rate of speed, said means being applied at diagonally opposite points of the reel, substantially as and for the purposes described.

4. In a potato digger, the combination of a revolving reel, having rings applied at different points, and a saddle or frame for supporting said reel composed of side pieces extending front and rear of the axle, and rings at opposite ends to receive and constitute bearings front and rear of the axle for the rings of the reel, substantially as and for the purposes described.

5. In a potato digger, the combination with a revolving reel, having rings applied at different points, of a second set of rings attached to suitable supports front and rear of the axle and adapted to receive the rings of the reel, front and rear of the axle and anti-frictional movable bearings between the two sets of rings, substantially as and for the purposes described.

6. In a potato digger, the combination of a frame or saddle composed of side pieces and rings supported at opposite ends thereof, of a reel having rings applied at different points to fit in the rings of the saddle and provided with flanges to bear against the rings of the saddle, teeth formed on said flanges, and toothed wheels at the front and rear of the frame meshing with said teeth and deriving motion from the driving wheels of the digger, substantially as and for the purposes described.

7. In a potato digger, a revolving reel composed of rings connected together by bars or rods and having rods extending backwardly from the rear ring, the spaces between the backwardly extending rods being greater than between the other rods for the purpose of assorting the potatoes and a saddle or frame provided with bearings for the rings of the reel, substantially as and for the purposes described.

8. In a potato digger, a conical revolving reel to receive the potatoes, said reel having longitudinal rods or bars to permit the potatoes and dirt to fall between them, the rear portions of said rods or bars being provided with transverse strips to prevent the vines and trash from falling between the bars while permitting the potatoes to drop between the bars, substantially as and for the purposes described.

9. In a potato digger, the combination of a revolving reel to receive the potatoes, a stationary ring to receive and constitute a bearing for the forward end of the reel, and a shovel located in front of the reel with its rear end entering the reel and pivoted to supports connected to the stationary ring, substantially as and for the purposes described.

10. In a potato digger, the combination with the saddle or frame having stationary rings at opposite ends for receiving and constituting a support for the revoluble reel, of the straps attached to said stationary rings and engaging the draft pole or shaft to secure the same in place, substantially as described.

In testimony whereof I affix my signature in presence of two witnesses.

ALVIN HARVEY DODD.

Witnesses:
F. M. PRAY,
E. G. AHLBERG.